United States Patent [19]
Sugimoto et al.

[11] 3,872,115
[45] Mar. 18, 1975

[54] CEPHALOSPORINS

[75] Inventors: Keiichi Sugimoto, Kawanishi; Kunio Kobayashi; Kouji Nishijima, both of Osaka; Shiro Morimoto, Kobe, all of Japan

[73] Assignee: Takeda Chemical Industries, Ltd., Osaka, Japan

[22] Filed: May 31, 1972

[21] Appl. No.: 258,177

[30] Foreign Application Priority Data
May 31, 1971  Japan.............................. 46-38007

[52] U.S. Cl. ............................ 260/243 C, 424/246
[51] Int. Cl. ........................................... C07d 99/24
[58] Field of Search ................................. 260/243 C

[56] References Cited
UNITED STATES PATENTS
3,663,540  5/1972  Lemieux et al. ................. 260/243 C
3,673,183  6/1972  Erickson ......................... 260/243 C

*Primary Examiner*—Nicholas S. Rizzo
*Attorney, Agent, or Firm*—Craig & Antonelli

[57] ABSTRACT

Novel cephalosporin compounds of the formula,

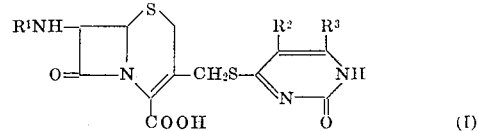

wherein $R^1$ is an acyl group, $R^2$ and $R^3$ represent hydrogen, a lower alkyl group, carboxylic group, amino group, dimethylamino group or hydroxymethyl group, respectively, or $R^2$ and $R^3$ may be bonded to form —NH—CH=N— group. These cephalosporins have a broad antimicrobial spectrum. They are, in particular, effective against colitis germs (*Escherichia coli*) at a lower concentration. Example thereof include 7-(2-thienylacetamido)-3-(2-oxopyrimidin-4-ylthio)-methylceph-3-em-4-carboxylic acid, 7-(phenylacetamido)-3-(2-oxopyrimidin-4-ylthio)-methylceph-3-em-4-carboxylic acid, 7-(phenoxyacetamido)3-(2-oxopyrimidin-4-ylthio)-methylceph-3-em-4-carboxylic acid and 7-(2-thienyl-acetamido)-3-(2-oxo-6-methylpyrimidin-4-ylthio)-methylceph-3-em-4-carboxylic acid.

30 Claims, No Drawings

CEPHALOSPORINS

This invention relates to novel cephalosporin compounds and preparation thereof. More particularly, this invention relates to cephalosporin compounds of the formula:

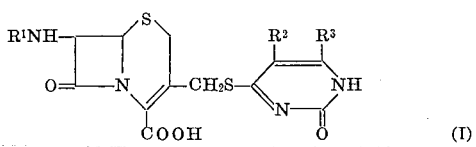

wherein $R^1$ is an acyl group, $R^2$ and $R^3$ represent hydrogen, a lower alkyl group, carboxylic group, amino group, dimethylamino group, or hydroxymethyl group, respectively, or $R^2$ and $R^3$ may be bonded to form —NH—CH=N— group. The invention also relates to processes for producing the same.

There have heretofore been known many cephalosporin C modified compounds by converting the 5-amino-5-carboxyvaleryl group at 7-position of cephalosporin C into various acyl groups and/or by converting the acetoxy group at 3-position into hydrogen, alkoxy group, substituted thio group, quaternary ammonium group, etc. However, these well-known cephalosporin compounds are not yet satisfactory in antimicrobial activities against a wide variety of microorganisms. Hence, a compound has been sought after which has a broad antimicrobial spectrum and is effective even at a lower concentration.

It has now been found that the novel cephalosporin compounds represented by the above formula (I) have broader antimicrobial spectra as compared with those of well-known cephalosporin derivatives. For example, the above cephalosporin compounds (I) are quite effective against colitis germs (*E. coli*) at a remarkably low concentration, against which commercially available cephalosporins are not so effective. In addition, it is discovered that the cephalosporin compounds (I) of the present invention are also quite effective against various pathogenic bacteria at a lower concentration as compared with well-known cephalosporins.

The acyl group represented by $R^1$ in the cephalosporin compounds (I) of the present invention may be any one which is usable as the N-acyl group of known cephalosporin or penicillin compounds. It may include aliphatic carboxylic acid acyl groups such as hexanoyl, heptanoyl, octanoyl, cyclopentanoyl and the like. It further includes mono-substituted acetyl groups such as phenylacetyl, 1-cyclohexenylacetyl, thienylacetyl, tetrazorylacetyl, cyanoacetyl, phenoxyacetyl, phenoxybutyloyl, nitrophenylacetyl, phenylpropionyl, butylthioacetyl, phenylthioacetyl, chlorophenylthioacetyl, benzylthioacetyl, phenetylthioacetyl, allylthioacetyl, pyridylthioacetyl, benzylthiopropionyl, etc. Alternatively, it may include disubstituted acetyl groups such as α-carboxyphenylacetyl, α-bromopropionyl, α-hydroxyphenylacetyl, α-sulfophenylacetyl, α-phenoxypropionyl, α-phenoxybutyloyl, etc. Furthermore, aromatic acyl groups such as benzoyl, 2,6-dimethoxybenzoyl, etc. or heterocyclic acyl groups such as 5-methyl-3-phenyl-4-isoxazolylcarbonyl, 3-o-chlorophenyl-5-methyl-4-isoxazolylcarbonyl, 3-(2,6-dichlorophenyl)-5-methyl-4-isoxazolylcarbonyl, etc. may also be used. Further examples are amino groups containing acyl groups such as phenylglycyl, cyclohexenylglycyl, thienylglycyl, furylglycyl, cyclohexadienylglycyl, phenylmethylglycyl, carbamoylphenylacetyl, 5-amino-5-carboxyvaleryl and so on. In addition, the acyl groups containing amino groups as set forth above may be those wherein the amino groups are protected by carbobenzoxy, phthalyl, phenylthiocarbonyl, methylsulfonylethoxycarbonyl, isobornyloxycarbonyl, benzyloxycarbonyl, etc.

Among these acyl groups, the acyl group of the formula:

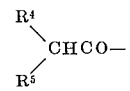

wherein $R^4$ is phenyl, phenoxy, cyclohexenyl, thienyl, phenylthio, or 3-amino-3-carboxypropyl, cyano, tetrazolyl, cyclohexyl group; and $R^5$ is hydrogen, or halogen atom, or amino, carboxyl, sulfo, carbamoyl, or hydroxy group, is most preferred.

In the above formula (I), $R^2$ may be different from or the same as $R^3$, either of which may be selected from hydrogen atom, $C_1$ to $C_4$ lower alkyl groups such as methyl, ethyl, propyl and the like, carboxylic group, amino group, dimethylamino group, or hydroxymethyl group. Alternatively, $R^2$ and $R^3$ may be bonded to form —NH—CH=N— group.

Such cephalosporin compounds (I) may be in the form of a salt with, for example, sodium, potassium, magnesium, calcium, aluminum, triethylamine or the like.

The cephalosporin compounds (I) of the present invention can be produced by reacting a compound of the formula,

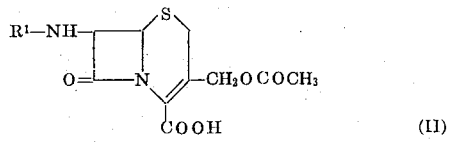

wherein $R^1$ is as defined above, or a salt thereof with a compound of the formula,

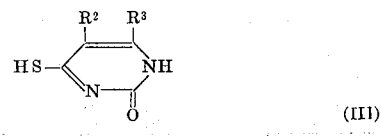

wherein $R^2$ and $R^3$ are as defined above, or a salt thereof.

The compounds represented by the formulas (II) and (III) may be in the form of salts with metals such as sodium, potassium, calcium, aluminum, magnesium or the like. alternatively, they may be in the form of salts with amines such as trimethylamine, triethylamine, tributylamine, triamylamine, pyridine or the like. Further, they may be in the form of esters, particularly preferably easily hydrolyzable esters, such as methyl, ethyl, benzyl, methoxybenzyl, nitrobenzyl, phenyl, nitrophenyl, methoxyphenyl, benzhydryl, trichloroethyl, trimethylsilyl, methylsulfonylethyl ester or the like.

The reaction between the compounds (II) and (III) is usually carried out in a suitable solvent. For example, alcohols such as methanol, ethanol, propanol and the like may be used. Alternatively, ketones such as acetone, methyl ethyl ketone, methyl isobutyl ketone and the like may also be used. Furthermore, dimethylformamide, dimethylsulfoxide, dioxane, chloroform, dichloromethane, dichloroethane or other organic solvents in general which will not disturb the reaction may also be used. Among these, the solvents having strong polarity are particularly preferred. Water alone or combined with the hydrophilic solvents among the organic solvents as mentioned above may also be used in the present invention. It is advantageous to maintain the pH value of the reaction solution in the range from 2 to 10, more preferably, from 4 to 8. For that purpose, suitable buffer agents such as sodium acetate may be added to the reaction solution to adjust the pH to a desired value. The reaction temperature is not critical. Usually, however, the reaction is carried out at an elevated temperature between 30° and 70°C. It is preferred to continue the reaction under such conditions from several hours to ten hours or more until the object 3-substituted cephem derivative (I) is obtained at a maximum yield.

The cephalosporin compounds (I) may alternatively be derived by acylating the compounds of the formula:

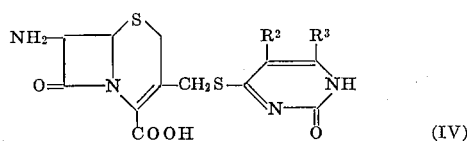

(IV)

wherein $R^2$ and $R^3$ are as defined above. In these acylating reactions, the carboxyl groups of the starting cephalosporin compounds (IV) may be protected as in the form of an ester such as benzyl, β-methylsulphenylethyl, benzhydryl, trimethylsilyl ester or the like. The acylating reaction is effected by reacting carboxylic acids to be incorporated including carboxylic acid residual groups or reactive derivatives thereof with 7-amino-3-substituted cephem derivatives (IV). The reactive derivatives of carboxylic acids to be incorporated may include acid halides such as acid chloride, acid bromide or the like. They further include acid anhydrides with alkyl carbonates, alkyl phosphates, other carboxylic acids or the like. They also include acid azides or active esters of carboxylic acids with pentachlorophenyl, p-nitrophenyl, N-hydroxysuccinic acid imide or the like. Alternatively, reactive derivatives formed between carboxylic acids and condensation agents such as carbodiimide, N,N-carbonyl diimidazole, acetylene ether or the like may also be used.

The acylation reaction may usually be conducted in a solvent. Suitable solvents are organic solvents in general, including acetone, dioxane, chloroform, methylene chloride, tetrahydrofuran, ethers, ethyl acetate ester or the like. Water or water-containing solvents may be also usable depending on the kinds of the starting materials. The reaction temperature is not critical, but the reaction may preferably be conducted under cooling or at room temperature. In case of the reaction, wherein acids are byproduced, the reaction may preferably be conducted in the presence of bases such as alkali hydrogen carbonate, alkali carbonate, alkali hydroxide, or organic amines, e.g. triethylamine, pyridine, etc. If an ester of 7-amino-3-substituted cephem derivative is used as the starting material, hydrolysis may be conducted after the reaction according to a method conventionally applied for hydrolysis of esters, e.g. treatment with acids or bases, etc. The reaction products can be separated according to conventional methods such as solvent extractions chromatography or the like. They may further, if desired, be refined by way of recrystallization or the like.

In either method, the reaction solution obtained is concentrated under reduced pressure at a low temperature. Then, a portion of organic solvents used in the reaction are removed by distillation. After the remaining liquid is adjusted to be acid, extraction is effected by the use of organic solvents such as ethyl acetate, butanol, chloroform or the like. The organic solvents are again distilled off by evaporation under reduced pressure at a low temperature, until the crude powders of the object cephalosporin compounds are obtained.

The thus obtained crude products may be made into salts of sodium, potassium, organic amines or the like according to suitable methods. Such salts are water-soluble, so that they may highly be evaluated as antimicrobial agents in various fields.

The novel 3-substituted cephem derivatives obtained according to the processes as described above are characteristic in that they possess a six membered heterocyclic group of the structure,

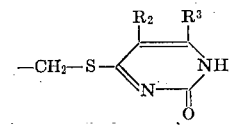

due to which they are found to have a stronger antimicrobial activity against both gram-positive and gram-negative bacteria of a wide range as compared with cephalosporin compounds of the prior art.

The cephalosporin compounds (I) of the present invention are generally administered orally as well as in an injectable form, etc. in a similar manner to the known cephalosporin preparations, but their dosage, dosage form, etc. vary with their substituent groups at 3-position and acyl groups at 7-position. For example, the effective dose of sodium 7-(2-thienylacetamido)-3-(2-oxopyrymidin-4-ylthio)-methylceph-3-em-4-carboxylate is about 0.25 g. to 1 g. per 4 to 6 hours for an adult human.

It is to be understood that the following examples are solely for the purpose of illustration and not to be construed as limitations of this invention, and that many variations may be resorted to without departing from the spirit and scope of this invention. In this specification "g.," "mg.," "ml.," "mcg.," "m.p." and "decomp." are "gram," "milligram," "milliliter," "microgram," "melting point" and "decomposed," respectively. Temperatures are all uncorrected, and percentages are all on the weight basis.

EXAMPLE 1

Sodium 7-(2-thienylacetamido)-3-(2-oxopyrimidin-4-ylthio)-methyl-ceph-3-em-4-carboxylate a. 5 g. of sodium 7-(2-thienylacetamido)-cephalosporanate and 1.6 g. of 4-thiopyrimidin-2-one were dissolved in 100 ml. of dimethylsulfoxide. The solution was heated at 60°C for 3 hours. The reaction solution was adjusted to a pH between 1.0 and 2.0 by the addition of 1N hydrochloric acid and thereafter the reaction product was separated therefrom. The product was suspended in a small amount of water, followed by adjusting the pH of the suspension to 7.0 by sodium hydroxide and freeze-dried to obtain 3.5 g. of powders of sodium 7-(2-thienylacetamido)-3-(2-oxopyrimidin-4-ylthio)-methyl-ceph-3-em-4-carboxylate (yield 55%).

m.p.: 180°–183°C (decomp.)

IR absorption spectrum (KBr disc):
1,760 cm$^{-1}$ ($\beta$-lactam, 1,665 cm$^{-1}$ (—CONH—), 1,610 cm$^{-1}$ (—COO$^-$)

UV absorption spectrum (pH 6.95 phosphate buffer solution):
$\lambda_{max}$ 230 m$\mu$ ($\epsilon$, 15,400); 275 m$\mu$ ($\epsilon$, 12,600); 297 m$\mu$ ($\epsilon$, 13000)

Elementary analysis:
Calculated for $C_{18}H_{15}N_4S_3O_5Na \cdot H_2O$:
C, 42.86; H, 3.37; N, 11.11; S, 19.05
Found:
C, 42.95; H, 3.28; N, 10.58; S, 19.03

Antimicrobial spectra (mcg./ml., agar dilution method)

| Organisms | | Test compound | Cepha-loridine | Cepha-lothin |
| --- | --- | --- | --- | --- |
| Staphylococcus aureus | 209 P | 0.01 | 0.02 | <0.02 |
| do | No. 87 | 0.2 | 20 | 0.5 |
| Bacillus subtilis PCI 219 | | <0.01 | 0.05 | 0.02 |
| Sarcina lutea PCI 1001 | | 0.05 | 0.05 | 0.1 |
| Escherichia coli NIHJ | | 1 | 10 | 20 |
| Klebsiella pneumoniae Kbl | | 1 | 10 | 2 |
| Proteus vulgaris Eb 51 | | 0.5 | 5 | 2 |
| Proteus mirabilis Eb 59 | | 2 | 10 | 10 | b. 1.7 g. of 7-amino-3-(2-oxopyrimidin-4-ylthio)-methyl-ceph-3-em-4-carboxylic acid were dissolved in 5 ml. of 1N sodium hydroxide under cooling on ice. Into this solution were added 1.68 g. of sodium hydrogen carbonate and 10 ml. of ethyl ether. Then, 5 ml. ethyl ether solution containing 0.96 g. of 2-thienyl acetyl chloride was further added dropwise for 10 minutes. The solution was stirred for 30 minutes at the same temperature and further stirred for one hour at room temperature. The aqueous layer was separated from the reaction mixture and 1N hydrochloric acid was added thereto to adjust it to a pH 1.0 to 2.0 under cooling on ice. The precipitates were collected and subjected to the same treatment as described in Example 1 (a). 2.3 g. of powders of sodium 7-(2-thienylacetamido)-3-(2-oxopyrimidin-4-ylthio)-methylceph-3-em-4-carboxylate were obtained (yield 91%).

c. After a similar manner to Example 1 (a), 3.2 g. of $\beta$-methylsulfonyl-ethyl 7-(2-thienylacetamido)-3-(2-oxopyrimidin-4-ylthio)-methylceph-3-em-4-carboxylate was obtained from 5 g. of $\beta$-methylsulfonylethyl 7-(2-thienylacetamido)cephalosporanate. This product was dissolved in 50 ml. of 50% aqueous tetrahydrofuran solution and 1N sodium hydroxide was gradually added thereto until pH became 8.0 The pH was then adjusted to 3.0 by 1N hydrochloric acid and tetrahydrofuran was removed by distillation under reduced pressure. The precipitated crystals were filtered and again 1N sodium hydroxide was added thereto. The aqueous solution, adjusted at pH 7.0, was freeze-dried to obtain 2.4 g. of sodium 7-(2-thienylacetamido)-3-(2-oxopyrimidin-4-ylthio)-methylceph-3-em-4-carboxylate. The analytical values for this compound were identical with those for the compound obtained in Example 1 (a).

EXAMPLE 2

Disodium 7-(D-5-aminoadipoylamido)-3-(2-oxopyrimidin-4-ylthio)-methylceph-3-em-4-carboxylate 2.27 g. of sodium 3-acetoxymethyl-7-(D-5-aminoadipoylamido)cephalosporanate and 0.65 g. of 4-thiopyrimidin-2-one were dissolved in 30 ml. of dimethylsulfoxide. The solution was heated at 60°C for 6 hours. The reaction liquid was adjusted to pH 2.0 by the addition of 0.5N hydrochloric acid. 2 Liters of acetone were added to the reaction mixture. The precipitates were suspended in a small amount of water, neutralized to pH 7.0 with sodium hydroxide and freeze-dried to obtain 2 g. of disodium 7-(D-5-aminoadipoylamido)-3-(2-oxopyrimidin-4-ylthio)-methylceph-3-em-4-carboxylate.

m.p.: 230°–237°C (decomp.)

IR absorption spectrum (KBr):
1,760 cm$^{-1}$ ($\beta$-lactam), 1,665 cm$^{-1}$ (—CONH—), 1,605 cm$^{-1}$ (—COO$^-$)

Elementary analysis:
Calculated for $C_{18}H_{19}N_5O_7S_2Na$:
C, 40.98; H, 3.60; N, 13.28; S, 12.14
Found:
C, 39.11; H, 4.01; N, 13.13; S, 12.40

EXAMPLE 3

Disodium 7-($\alpha$-carboxyphenylacetamido)-3-(2-oxopyrimidin-4-ylthio)-methylceph-3-em-4-carboxylate:

1.43 g of sodium 3-acetoxymethyl-7-($\alpha$-carboxyphenylacetamido)cephalosporanate and 0.384 g. of 4-thiopyrimidin-2-one were dissolved in 10 ml. of dimethylsulfoxide. This solution was heated at 50°C for 8 hours. The reaction liquid was then adjusted to pH 2.0 by addition of 0.5N hydrochloric acid. The precipitates were filtered and the powders obtained were subjected to the same treatment as described in Example 2. 0.4 g. of disodium 7-($\alpha$-carboxyphenylacetamido)-3-(2-oxopyrimidin-4-ylthio)-methylceph-3-em-4-carboxylate were obtained in the form of powders.

m.p.: 160°–165°C (decomp.)

IR absorption spectrum (KBr):
1,755 cm$^{-1}$ ($\beta$-lactam), 1,660 cm$^{-1}$ (—CONH—), 1,605 cm$^{-1}$ (—COO$^-$)

Elementary analysis:
Calculated for $C_{21}H_{16}N_4S_2O_7Na_2$:
C, 46.14; H, 2.93; N, 10.15; S, 11.72
Found:
C, 45.61; H, 3.78; N, 9.84; S, 11.05

Antimicrobial spectrum (mcg./ml.):

| | |
| --- | --- |
| Staphylococcus aureus | 0.1 |
| Bacillus subtilis | 0.05 |
| Proteus morganii | 2.0 |

EXAMPLE 4

Sodium 7-(phenylacetamido)-3-(2-oxopyrimidin-4-ylthio)-methylceph-3-em-4-carboxylate:

a. 4.12 g. of sodium 3-acetoxymethyl-7-(phenylacetamido)cephalosporanate and 1.28 g. of 4-thio-pyrimidin-2-one were dissolved in 30 ml. of dimethylsulfoxide. The solution was heated at 60°C for 8 hours. The reaction solution was similarly treated as described in Example 1 (a) to obtain 1.24 g. of powders of sodium 7-(phenylacetamido)-3-(2-oxopyrimidin-4-ylthio)-methylceph-3-em-4-carboxylate.

m.p.: 205°–210°C (decomp.)
IR absorption spectrum (KBr):
1,760 cm$^{-1}$ ($\beta$-lactam), 1,660 cm$^{-1}$ (—CONH—), 1,610 cm$^{-1}$ (—COO$^-$)
Elementary analysis:
Calculated for $C_{20}H_{17}N_4S_2O_5Na$:
C, 47.99; H, 3.57; N, 11.66; S, 13.35
Found:
C, 47.63; H, 3.98; N, 11.51; S, 12.66 b. 4.0 g. of sodium 7-(phenylacetamido)-3-bromomethylceph-3-em-4-carboxylate and 1.28 g. of 4-thiopyrimidin-2-one were dissolved in 30 ml. of dimethylsulfoxide. The solution was heated at 60°C for 8 hours. The reaction solution was treated similarly as in Example 1 (a) to obtain 1.14 g. of powders of sodium 7-(phenylacetamido)-3-(2-oxopyrimidin-4-ylthio)-methylceph-3-em-4-carboxylate. The analytical values for this compound were identical with those for the compound obtained in Example 4 (a).

Antimicrobial spectrum (mcg./ml., agar dilution method)

| Organisms | | Test compound | Cepha-loridine | Cepha-lothin |
|---|---|---|---|---|
| Staphylococcus aureus | 209 P | 0.05 | 0.02 | <0.02 |
| do. | No.87 | 0.5 | 20 | 0.5 |
| Bacillus subtilis PCI 219 | | <0.01 | 0.05 | 0.02 |
| Sarcina lutea PCI 1001 | | 0.1 | 0.05 | 0.1 |
| Escherichia coli NIHJ | | 5 | 10 | 20 |
| Proteus vulgaris Eb 51 | | 5 | 5 | 2 |
| Proteus mirabilis Eb 59 | | 5 | 10 | 10 |

EXAMPLE 5

The following compounds were synthesized according to a similar procedure as described in Example 4.

a. Sodium 7-(cyanoacetamido)-3-(2-oxopyrimidin-4-ylthio)-methylceph-3-em-4-carboxylate
m.p.: 185°–198°C (decomp.)
IR absorption spectrum (KBr):
1,770 cm$^{-1}$ ($\beta$-lactam), 1,655 cm$^{-1}$ (—CONH—), 1,605 cm$^{-1}$ (—COO$^-$)
Elementary analysis:
Calculated for $C_{15}H_{12}N_5S_2O_5Na$:
C, 41.95; H, 2.79; N, 16.31; S, 14.91
Found:
C, 39.94; H, 3.76; N, 16.12; S, 14.85 b. Sodium 7-(phenoxyacetamido)-3-(2-oxopyrimidin-4-ylthio)-methylceph-3-em-4-carboxylate
m.p.: 201°–209°C (decomp.)
IR absorption spectrum (KBr):
1,760 cm$^{-1}$ ($\beta$-lactam), 1,655 cm$^{-1}$ (—CONH—), 1,610 cm$^{-1}$ (—COO$^-$)
Elementary analysis:
Calculated for $C_{20}H_{17}N_4S_2O_6Na$:
C, 48.38; H, 3.45; N, 11.29; S, 12.92
Found:
C, 47.51; H, 4.56; N, 10.72; S, 12.04 c. Sodium 7-(phenylthioacetamido)-3-(2-oxopyrimidin-4-ylthio)-methylceph-3-em-4-carboxylate:
m.p.: 196°–198°C (decomp.)
IR absorption spectrum (KBr):
1,760 cm$^{-1}$ ($\beta$-lactam), 1,655 cm$^{-1}$ (—CONH—), 1,605 cm$^{-1}$ (—COO$^-$)
Elementary analysis:
Calculated for $C_{20}H_{17}N_4S_3O_5Na$:
C, 46.87; H, 3.43; N, 10.93; S, 18.77
Found:
C, 46.13; H, 4.08; N, 10.24; S, 18.58

Antimicrobial spectrum (mcg./ml., agar dilution method)

| Organisms | | Test compound | Cepha-loridine | Cepha-lothin |
|---|---|---|---|---|
| Staphylococcus aureus | 209 P | 0.01 | 0.02 | <0.02 |
| do. | No. 87 | 0.05 | 20 | 0.5 |
| Bacillus subtilis PCI 219 | | <0.01 | 0.05 | 0.02 |
| Sarcina lutea PCI 1001 | | 0.02 | 0.05 | 0.1 |
| Escherichia coli NIHJ | | 1 | 10 | 20 |
| Klebsiella pneumoniae Kbl | | 2 | 10 | 2 | d. Sodium 7-(1-tetrazolylacetamido)-3-(2-oxopyrimidin-4-ylthio)-methylceph-3(-em-4-carboxylate
m.p.: 150°–157°C (decomp.)
IR absorption spectrum (KBr):
1,770 cm$^{-1}$ ($\beta$-lactam), 1,655 cm$^{-1}$ (—CONH—), 1,610 cm$^{-1}$ (—COO$^-$)
Elementary analysis:
Calculated for $C_{15}H_{13}N_8S_2O_5Na$:
C, 38.13; H, 2.75; N, 29.66; S, 13.55
Found:
C, 35.48; H, 3.75; N, 28.63; S, 13.01 e. Sodium 7-(cyclohexylacetamido)-3-(2-oxopyrimidin-4-ylthio)-methylcepth-3-em-4-carboxylate:
m.p.: 194°–196°C (decomp.)
IR absorption spectrum (KBr):
1,760 cm$^{-1}$ ($\beta$-lactam), 1,660 cm$^{-1}$ (—CONH—), 1,610 cm$^{-1}$ (—COO$^-$)
Elementary analysis:
Calculated for $C_{20}H_{23}N_4S_2O_5Na$:
C, 49.37; H, 4.76; N, 11.52; S, 13.18
Found:
C, 48.96; H, 4.24; N, 10.92; S, 12.71 f. Sodium 7-($\alpha$-bromopropionylamido)-3-(2-oxopyrimidin-4-ylthio)-methylceph-3-em-4-carboxylate
m.p.: 155°–162°C (decomp.)
IR absorption spectrum (KBr):
1,765 cm$^{-1}$ ($\beta$-lactam), 1,660 cm$^{-1}$ (—CONH—), 1,610 cm$^{-1}$ (—COO$^-$)
Elementary analysis:
Calculated for $C_{15}H_{14}N_4S_2O_5BrNa$:
C, 36.22; H, 2.82; N, 11.27; S, 12.88
Found:
C, 35.11; H, 3.56; N, 11.12; S, 13.23 g. Sodium 7-[cyclohexenyl-(1,2-acetamido]-3-[2-oxopyrimidin-4-ylthio]-methylcepth-3-em-4-carboxylate m.p.: 155°–160°C (decomp.)
IR absorption spectrum (KBr):
1,765 cm$^{-1}$ ($\beta$-lactam), 1,665 cm$^{-1}$ (—CONH—), 1,605 cm$^{-1}$ (—COO$^-$)
Elementary analysis:
Calculated for $C_{20}H_{21}N_4S_2O_5Na$:
C, 49.48; H, 4.32; N, 11.54; S, 13.19
Found:
C, 48.92; H, 5.00; N, 11.13; S, 12.62

EXAMPLE 6

Sodium 7-($\alpha$-aminophenylacetamido)-3-(2-oxopyrimidin-4-ylthio)-methylceph-3-em-4-carboxylate 4.05 g. of 3-acetoxymethyl-7-($\alpha$-aminophenylacetamido)cephalosporanic acid and 1.28 g. of 4-thio-4-thio-pyrimidin-2-one were dissolved in 60 ml. of dimethylsulfoxide. The solution was heated at 60°C for 8 hours. The reaction solution was then poured into 100 ml. of ice water. The precipitates were separated to obtain powders, which were subjected to the same treatment as described in Example 3 to give 3.5 g. of sodium 7-($\alpha$-aminophenylacetamido)-3-(2-oxopyrimidin-4-ylthio)-methylceph-3-em-4-carboxylate.

m.p.: 210°–216°C (decomp.)
IR absorption spectrum (KBr):
1,765 cm$^{-1}$ ($\beta$-lactam), 1,655 cm$^{-1}$ (—CONH—), 1,605 cm$^{-1}$ (—COO$^-$)
Elementary analysis:
Calculated for $C_{20}H_{18}N_5S_2O_5Na$:
C, 48.48; H, 3.66; N, 14.13; S, 12.94
Found:
C, 46.80; H, 3.95; N, 13.68; S, 12.89

EXAMPLE 7

Sodium 7-($\alpha$-hydroxyphenylacetamido)-3-(2-oxopyrimidin-4-ylthio)-methylceph-3-em-4-carboxylate 4.05 g. of sodium 3-acetoxymethyl-7-($\alpha$-hydroxyphenylacetamido)cephalosporanate and 1.28 g. of 4-thiopyrimidin-2-one were dissolved in 60 ml. of 50% aqueous dimethylsulfoxide. The solution was heated at 60°C for 8 hours. The reaction solution was treated similarly as described in Example 3 to obtain 3.0 g. of sodium 7-($\alpha$-hydroxyphenylacetamido)-3-(2-oxopyrimidin-4-ylthio)-methylceph-3-em-4-carboxylate.

m.p.: 210°–218°C (decomp.)
IR absorption spectrum (KBr):
1,755 cm$^{-1}$ ($\beta$-lactam), 1,660 cm$^{-1}$ (—CONH—), 1,610 cm$^{-1}$ (—COO$^-$)
Elementary analysis:
Calculated for $C_{20}H_{17}N_4S_2O_6Na$:
C, 48.48; H, 3.66; N, 10.93; S, 12.94
Found:
C, 46.82; H, 3.76; N, 10.91; S, 12.47

EXAMPLE 8

Disodium 7-($\alpha$-sulfophenylacetamido)-3-(2-oxopyrimidin-4-ylthio)-methylceph-3-em-4-carboxylate 1.6 g. of disodium 3-acetoxymethyl-7-($\alpha$-sulfonylphenylacetamido)cephalosporanate were dissolved in 50% aqueous dimethylsulfoxide. The solution was adjusted to pH 6.5 by Dowex-50 (H$^+$) (trade name of Dow Chemical Co.) resin. After removal of said resin, 0.4 g. of 4-thiopyrimidin-2-one were added to the solution, which was then heated at 60°C for 6 hours. The reaction solution was poured into 200 ml. of tetrahydrofuran for precipitation. The precipitated honey-like substance was separated therefrom and, after further addition of acetone thereto, 1.5 g. of disodium 7-($\alpha$-sulfophenylacetamido)-3-(2-oxopyrimidin-4-ylthio)-methylceph-3-em-4-carboxylate were obtained.

m.p.: 205°–212°C (decomp.)
IR absorption spectrum (KBr):
1,755 cm$^{-1}$ ($\beta$-lactam), 1,660 cm$^{-1}$ (—CONH—), 1,605 cm$^{-1}$ (—COO$^-$)
Elementary analysis:
Calculated for $C_{20}H_{16}N_4S_3O_8Na_2$:
C, 41.24; H, 2.77; N, 9.62; S, 16.51
Found:
C, 39.22; H, 3.62; N, 9.41; S, 15.90

EXAMPLE 9

Sodium 7-(2-thienylacetamido)-3-(2-oxo-6-aminopyrimidin-4-ylthio)-methylceph-3-em-4-carboxylate 0.5 g. of sodium 3-acetoxymethyl-7-(2-thienylacetamido)cephalosporanate and 0.18 g. of 4-thio-6-aminopyrimidin-2-one were dissolved in 5 ml. of a 50% aqueous dimethylsulfoxide. The solution was heated at 60°C for 5 hours. The reaction solution was poured into 100 ml. of acetone. The precipitated honey-like substance was separated, washed and dried to powders to obtain 0.4 g. of sodium 7-(2-thienylacetamido)-3-(2-oxo-6-aminopyrimidin-4-ylthio)-methylceph-3-em-4-carboxylate.

m.p.: 135°–140°C (decomp.)
IR absorption spectrum (KBr):
1,760 cm$^{-1}$ ($\beta$-lactam), 1,660 cm$^{-1}$ (—CONH—), 1,605 cm$^{-1}$ (—COO$^-$)
Elementary analysis:
Calculated for $C_{18}H_{16}N_5S_3O_5Na$:
C, 43.11; H, 3.22; N, 13.96; S, 19.77
Found:
C, 42.86; H, 3.96; N, 13.71; S, 19.54
Antimicrobial spectrum
*Bacillus subtilis* 0.5

EXAMPLE 10

Sodium 7-(2-thienylacetamido)-3-(2-oxo-5-methylpyrimidin-4-ylthio)-methylceph-3-em-4-carboxylate 0.5 g. of sodium 34-acetoxymethyl-7-(2-thienylacetamido)cephalosporanate and 0.17 g. of 4-thio-5-methylpyrimidin-2-one were dissolved in 5 ml. of aqueous dimethylsulfoxide. The solution was heated at 60°C for 5 hours. The reaction solution was treated similarly as described in Example 1 (a) to obtain 0.42 g. of powders of sodium 7-(2-thienylacetamido)-3-(2-oxymethylpyrimidin-4-ylthio)-methylceph-3-em-4-carboxylate.

m.p.: 206°–215°C (decomp.)
IR absorption spectrum (KBr):
1,760 cm$^{-1}$ ($\beta$-lactam), 1,655 cm$^{-1}$ (—CONH—), 1,610 cm$^{-1}$ (—COO$^-$)
Elementary analysis:
Calculated for $C_{19}H_{17}N_4S_3O_5Na$:
C, 45.59; H, 3.42; N, 11.19; S, 19.22

Found
 C, 44.26; H, 4.16; N, 10.54; S, 18.79

EXAMPLE 11

Sodium 7-(2-thienylacetamido)-3-(2-oxopurin-6-ylthio)-methylceph-3-em-4-carboxylate 0.5 g. of sodium 3-acetoxymethyl-7-(2-thienylacetamido)cephalosporante and 0.2 g. of ammonium 6-thiopurin-2-one were dissolved in 10 ml. of dimethylsulfoxide. The solution was heated to 60°C for 5 hours. The reaction solution was treated similarly as described in Example 1 (a) to obtain powders of sodium 7-(2-thienylacetamido)-3-(2-oxopurin-6-ylthio)-methylceph-3-em-4-carboxylate.

m.p.: 225°–227°C (decomp.)
IR absorption spectrum (KBr):
 1,755 cm$^{-1}$ ($\beta$-lactam), 1,680 cm$^{-1}$ (—CONH—), 1,610 cm$^{-1}$ (—COO$^-$)
Elementary analysis:
 Calculated for $C_{19}H_{16}N_6S_3O_5Na$:
  C, 43.34; H, 2.87; N, 15.96; S, 18.27
 Found:
  C, 41.42: H, 3.63; N, 15.72; S, 17.94

According to a similar procedure as described above, the following compounds were synthesized.

a. Sodium 7-(2-thienylacetamido)-3-(2-oxo-6-methylpyrimidin-4-ylthio)-methylceph-3-em-4-carboxylate m.p.: 196°–205°C (decomp.)
IR absorption spectrum (KBr):
 1,765 cm$^{-1}$ ($\beta$-lactam), 1,660 cm$^{-1}$ (—COHN—), 1,605 cm$^{-1}$ (—COO$^-$)
Elementary analysis:
 Calculated for $C_{19}H_{17}N_4S_3O_5Na$:
  C, 45.59; H, 3.42; N, 11.19; S, 19.22
 Found:
  C. 45.26; H, 4.56; N, 10.92; S, 18.98

Antimicrobial spectrum (mcg./ml., agar dilution method)

| Organisms | | Test compound | Cephloridine | Cephalothin |
|---|---|---|---|---|
| Staphylococcus aureus | 209 P | 0.05 | 0.02 | <0.02 |
| do. | No. 87 | 0.1 | 20 | 0.5 |
| Bacillus subtilis PCI 219 | | <0.01 | 0.05 | 0.02 |
| Sarcina lutea PCI 1001 | | 0.05 | 0.05 | 0.1 |
| Escherichia coli NIHJ | | 0.5 | 10 | 20 |
| Klebsiella pneumoniae Kbl | | 1 | 10 | 2 |
| Proteus vulgaris Eb 51 | | 1 | 5 | 2 |
| Proteus mirabilis Eb 59 | | 10 | 10 | 10 |
| Proteus morganii Eb 54 | | 10 | >100 | >100 | b. Disodium 7-(2-thienylacetamido)-3-(2-oxo-6-carboxypyrimidin-4-ylthio)-methylcepth-3-em-4-carboxylate m.p.: 155°–156°C (decomp.)
IR absorption spectrum (KBr):
 1,765 cm$^{-1}$ ($\beta$-lactam), 1,665 cm$^{-1}$ (—COHN—), 1,605 cm$^{-1}$ (—COO$^-$)
Elementary analysis:
 Calculated for $C_{19}H_{14}N_4S_3O_7Na_2$:
  C, 41.30; H, 2.55; N, 10.14; S, 17.41
 Found:
  C, 40.74; H, 3.21; N, 9.05; S, 16.83 c. Disodium 7-(2-thienylacetamido)-3-(2-oxo-5-carboxypyrimidin-4-ylthio)-methylceph-3-em-4-carboxylate m.p.: 160°–165°C (decomp.)
IR absorption spectrum (KBr):
 1,765 cm$^{-1}$ ($\beta$-lactam), 1,665 cm$^{-1}$ (—COHN—), 1,610 cm$^{-1}$ (—COO$^-$)
Elementary analysis:
 Calculated for $C_{19}H_{14}N_4S_3O_7Na_2$:
  C, 41.30; H, 2.55; N, 10.14; S, 17.41
 Found:
  C, 39.65; H, 3.84; N, 9.46; S, 16.72 d. Sodium 7-(2-thienylacetamido)-3-(2-oxo-5,6-dihydropyrimidin-4-ylthio)-methylceph-3-em-4-carboxylate:

m.p.: 211°–218°C (decomp.)
IR absorption spectrum (KBr):
 1,760 cm$^{-1}$ ($\beta$-lactam), 1,665 cm$^{-1}$ (—COHN—), 1,610 cm$^{-1}$ (—COO$^-$)
Elementary analysis:
 Calculated for $C_{18}H_{17}N_4S_3O_5Na$:
  C, 44,26; H, 3, 48, N, 11, 48, S, 19,67
 Found:
  C, 39.78; H, 4.12; N, 10.11; S, 17.92 e. Sodium 7-(2-thienylacetamido)-3-(2-oxo-5-hydroxymethylpyrimidin-4-ylthio)-methyl-ceph-3-em-4-carboxylate m.p.: 186°–192°C (decomp.)
IR absorption spectrum (KBr):
 1,765 cm$^{-1}$ ($\beta$-lactam), 1,660 cm$^{-1}$ (—COHN—), 1,605 cm$^{-1}$ (—COO$^-$)
Elementary analysis:
 Calculated for $C_{19}H_{17}N_4S_3O_6Na$:
  C, 44.18, H, 3.32; N, 10.85; S, 18.62
 Found:
  C, 43.57; H, 4.28; N, 9.64; S, 18.34

EXAMPLE 12

Sodium 7-($\alpha$-carbamoylphenylacetamido)-3-(2-oxopyrimidin-4-ylthio)-methylcepth-3-em-4-carboxylate a. 3 g. of sodium 3-acetoxymethyl-7-($\alpha$-carbamoylphenylacetamido)cephalosporanate and 850 mg. of 4-thiopyrimidin-2-one were dissolved in 30 ml. of dimethylsulfoxide. The solution was adjusted to pH 7.0 by 1N aqueous ammonia and heated at 60°C for 3 hours. The reaction product was treated similarly as described in Example 1 (a) to obtain powders of sodium 7($\alpha$-carbamoylphenylacetamido)-3-(2-oxopyrimidin-4-ylthio)-methylceph-3-em-4-carboxylate.

m.p.: 190°–195°C (decomp.)
IR absorption spectrum (KBr):
 1,750 cm$^{-1}$ ($\beta$-lactam), 1,680 cm$^{-1}$ (—COHN—), 1,610 cm$^{-1}$ (—COO$^-$)
Elementary analysis:
 Calculated for $C_{21}H_{18}N_5S_2O_6Na$:
  C, 48.18; H, 3.47; N, 13.38: S, 12.25
 Found:
  C, 47.62; H, 3.96; N, 13.12; S, 11.86

Antimicrobial spectrum
*Bacillus subtilis*   0.05 b. 1.7 g. of 7-amino-3-(2-oxopyrimidin-4-ylthio)-methylceph-3-em-4-carboxylic acid was suspended in 20 ml. of dichloromethane. While this suspension was cooled on ice, 1.25 g. of triethylamine were added and dissolved therein. To this solution was further added 15 g. of paranitrophenyl ester of $\alpha$-carbamoylphenyl acetic acid. The solution was stirred under ice-cooling for 30 minutes and further stirred at room temperature for one hour. 20 ml. of water were added to the reaction solution under cooling on ice and pH thereof was adjusted to 1.0 to 2.0 The precipitated crystals were collected by filtration and subjected to the same treatment as described in Example 1 (a) to obtain powders of sodium 7-(α-carbamoylphenylacetamido)-3-(2-oxopyrimidin-4-ylthio)-methylceph-3-em-4-carboxylate.

EXAMPLE 13

Sodium 7-(2-thienylacetamido)-3-[2-oxo-(1-β-D-ribofuranosyl)pyrimidin-4-ylthio]-methylceph-3-em-4-carboxylate 5 g. of sodium 7-(2-thienylacetamido)cephalosporonate and 3.3 g. of 4-thio-(1-β-D-riboturanosyl)-pyrimidin-2-one were dissolved in 50 ml. of water. The solution was heated at 60°C for 3 hours. The reaction solution was adjusted to pH 2.0 by addition of 0.5N hydrochloric acid. The precipitated crystals were separated therefrom and neutralized to pH 6.5 by 0.5N sodium hydroxide. They were then freeze-dried to obtain 4.5 g of white powders.

m.p.: 155°–160°C (decomp.)

IR absorption spectrum (KBr):
1770 cm$^{-1}$ (β-lactam), 1670 cm$^{-1}$ (-COHN-), 1620 cm$^{-1}$ (-COO$^-$)

UV absorption spectrum (pH 6.95, phosphate buffer):
λmax 230 mμ (ε, 17300), 277 mμ (ε, 13300), 302.5 mμ (ε, 15200)

Elementary analysis:
Calculated for $C_{23}H_{23}N_4S_3O_9Na·3H_2O$:
C, 41.06; H, 4.16; N, 8.23; S, 14.28
Found:
C, 41.11; H, 3.75; N, 7.88, S, 14.68

EXAMPLE 14

Sodium 7-(2-thienylacetamido)-3-(2-oxo-5-dimethylaminopyrimidin-4-ylthio)-methylceph-3-em-4-carboxylate 5 g. of sodium 7-(2-thienylacetamido)cephalosporanate and 2.2 g. of 4thio-5-dimethylaminopyrimidin-2-one were dissolved in 50 ml. 50% aqueous dimethylformamide. The solution was heated at 60°C for 8 hours. The powders obtained by drying the reaction solution under reduced pressure were suspended in 100 ml. of water and neutralized to pH 6.5 with sodium hydrogen carbonate. After removal of insoluble substances by filtration, the filtrate was freeze-dried to obtain 1.7 g. of light yellow powders.

m.p.: 165°–170°C (decomp.)

IR absorption spectrum (KBr):
1,700 cm$^{-1}$ (β-lactam), 1,675 cm$^{-1}$ (—CONH—) 1,615 cm$^{-1}$ (—COO$^-$)

Elementary analysis:
Calculated for $C_{20}H_{20}N_5S_3O_5Na$:
C, 45.02; H, 3.75; N, 13.13; S, 18.01
Found:
C, 44.81; H, 4.26; N, 12.94; S, 17.63

EXAMPLE 15

Sodium 7-(2-thienylacetamido)-3-(2-oxo-5-aminopyrimidin-4-ylthio)-methylceph-3-em-4-carboxylate 5 g. of sodium 7-(2-thienylacetamido)cephalosporanate and 2.5 g. of 4-thio-5-aminopyrimidin-2-one were dissolved in 50 ml. of 50% aqueous dimethylformamide. The solution was heated at 60°C for 8 hours. The powders obtained by drying the reaction solution under reduced pressure were suspended in 100 ml. of water and neutralized to pH 6.5 by sodium hydrogen carbonate. After removal of insoluble substances by filtration, the filtrate was freeze-dried to obtain 1.8 g. of light yellow powders.

m.p.: 140°–150°C (decomp.)

IR absorption spectrum (KBr):
1,760 cm$^{-1}$ (β-lactam), 1,660 cm$^{-1}$ (—CONH—), 1,605 cm$^{-1}$ (—COO$^-$)

Elementary analysis:
Calculated for $C_{18}H_{16}N_5S_3O_5Na$:
C, 43.11; H, 3.22; N, 13.96; S, 19.77
Found:
C, 42.86; H, 3.96; N, 13.71; S, 19.54

EXAMPLE 16

Sodium 7-(α-carbamoylphenylacetamido)-3-(2-oxo-5-methylpyrimidin-4-ylthio)-methylceph-3-em-4-carboxylate 5 g. of sodium 7-(α-carbamoylphenylacetamido)-cephalosporanate were dissolved in 50 ml. of water. After further addition of 3 g. of 4-thio-5-methylpyrimidin-2-one and 75 ml. of dimethylsulfoxide, the solution was heated at 60°C for 8 hours. The reaction solution was concentrated to dryness under reduced pressure. The residue was shaken with a mixture of 50 ml. of water and 50 ml. of ethyl acetate. The aqueous layer was washed with 50 ml. portion each of ethyl acetate for three times. The aqueous layer was then freeze-dried to obtain light yellow powders, which were thereafter subjected to chromatography by passing column-wise over Amberlite XAD-2 (trade name of ROhm and Haas Co.) to obtain 1.7 g. of white powders.

m.p.: 169°–175°C (decomp.)

IR absorption spectrum (KBr):
1,770 cm$^{-1}$ (β-lactam), 1,610 to 1,700 cm$^{-1}$ (—COHN—, —COO$^-$)

Elementary analysis:
Calculated for $C_{22}H_{20}N_5S_2O_6Na$:
C, 49.16; H, 3.72; N, 13.03; S, 11.91
Found:
C, 48.51; H, 4.45; N, 12.76; S, 11.39

EXAMPLE 17

Disodium 7-(α-carboxylphenylacetamido)-3-(2-oxo-5-methylpyrimidin-4-ylthio)-methylceph-3-em-4-carboxylate 5 g. of sodium 7-(α-carboxyphenylacetamido)-cephalosporanate and 1.5 g. of 4-thio-5-methylpyrimidin-2-one were dissolved in 75 ml. of 70% aqueous dimethylformamide. The solution was heated at 60°C for 8 hours. The reaction solution was dried under reduced pressure. The residues were added with 50 ml. of water and neutralized to pH 6.5 by sodium hydrogen carbonate. After removal of insoluble substances by filtration, the filtrate was adjusted to pH 2.0 by addition of 0.5N hydrochloric acid. The precipitated crystals were separated therefrom and adjusted to pH 6.5 by 0.5N sodium hydroxide. After freeze-drying 1.8 g. of light yellow powders were obtained.

m.p.: 95°–100°C (decomp.)

IR absorption spectrum (KBr):
1,750 cm$^{-1}$ (β-lactam), 1,675 cm$^{-1}$ (—CONH—), 1,620 cm$^{-1}$ (—COO$^-$)

Elementary analysis:
Calculated for $C_{22}H_{18}N_4S_2O_7Na_2$:
C, 47.14; H, 3.21; N, 9.99; S, 11.43

Found:
C, 46.39; H, 3.99; N, 9.54; S, 10.87

Antimicrobial spectrum (mcg./ml., agar dilution method)

| Organisms | | Test compound | Cepthloridine | Cephalothin |
|---|---|---|---|---|
| *Staphylococcus aureus* | 209 P | 0.05 | 0.02 | <0.02 |
| do. | No. 87 | 0.5 | 20 | 0.5 |
| | *Bacillus subtilis* PCI 219 | <0.01 | 0.05 | 0.02 |
| | *Sarcina lutea* PCI 1001 | 0.2 | 0.05 | 0.1 |
| | *Escherichia coli* NIHJ | 2 | 10 | 20 |
| | *Klebsiella pneumoniae* Kbl | 5 | 10 | 2 |

EXAMPLE 18

Disodium 7-(α-sulfophenylacetamido)-3-(2-oxo-5-methylpyrimidin-4-ylthio)-methylceph-3-em-4-carboxylate 3.3 g. of sodium 7-(α-sulfophenylacetamido)-cephalosporanate and 0.53 g. of 4-thio-5-methylpyrimidin-2-one were dissolved in 40 ml. of 70% aqueous dimethylformamide. The solution was heated at 60°C for 8 hours. The reaction solution was poured into 400 ml. of tetrahydrofuran. The precipitated honey-like substance was separated therefrom. It was further washed with 100 ml. of tetrahydrofuran and 100 ml. of acetone. 1.4 g. of light yellow powders were obtained.

m.p.: 115°–120°C (decomp.)
IR absorption spectrum (KBr):
1,760 cm$^{-1}$ (β-lactam), 1,670 cm$^{-1}$ (CONH—), 1,610 cm$^{-1}$ (—COO$^-$), 1,040 cm$^{-1}$ (—SO$_3^-$)
Elementary analysis:
Calculated for $C_{21}H_{18}N_4S_3O_8Na_2$:
C, 42.21; H, 3.01; N, 9.38; S, 16.08
Found:
C, 41.72; H, 3.95; N, 8.79; S, 15.67

EXAMPLE 19

Trifluoroacetate of 7-(α-aminophenylacetamido)-3-(2-oxo-5-methylpyrimidin-4-ylthio)-methylceph-3-em-4-carboxylic acid 5 g. of sodium 7-[α-(isobornyloxycarbonyl)aminophenylacetamido]cephalosporanate and 3.5 g. of 4-thio-5-methylpyrimidin-2-one were dissolved in 200 ml. of 70% aqueous dimethylsulfoxide. The solution was heated at 60°C for 5 hours. The reaction solution was dried under reduced pressure. 50 ml. of water and 50 ml. of ethyl acetate were added to the dried residue. After shaking the mixture, the aqueous layer was washed three times with 50 ml. each portion of ethyl acetate. The aqueous layer was adjusted to pH 2.0 by addition of 0.5N hydrochloric acid. 50 ml. of ethyl acetate was further added thereto and the mixture was shaken. The ethyl acetate layer was, after washing with water, neutralized to pH 6.5 by 0.5N sodium hydrogen carbonate, while the aqueous layer was freezedried to obtain 2 g. of light yellow powders.

0.5 g. of the thus obtained sodium 7-[α-(isobornyloxycarbonyl)aminophenylacetamido]-3-(2-oxo-5-methylpyrimidin-4-ylthio)-methylceph-3-em-4-carboxylate was dissolved in 10 ml. of trifluoroacetic acid. The solution was further added with 0.5 ml. of anisole and stirred at room temperature for one hour. The reaction solution was poured into 50 ml. of ethyl ether. The precipitates were collected by filtration and washed with 50 ml. of ethyl ether to obtain 0.4 g. of white powders.

m.p.: 110°–115°C (decomp.)
IR absorption spectrum (KBr):
1,770 cm$^{-1}$ (β-lactam), 1,675 cm$^{-1}$ (—COOH—), 1,695 cm$^{-1}$ (—CONH—)
Elementary analysis:
Calculated for $C_{21}H_{21}N_5S_2O_5 \cdot CF_3CO_2H$:
C, 45.92; H, 3.66; N, 11.64; S 10.64
Found:
C, 45.39; H, 3.98; N, 11.02; S, 10.18

EXAMPLE 20

Trifluoroacetate of 7-amino-3-(2-oxo-5-methylpyrimidin-4-ylthio)-methylceph-3-em-4-carboxylic acid 5 g. of sodium 7-(isobornyloxycarbonyl)aminocephalosphoranate and 2 g. of 4-thio-5-methylpyrimidin-2-one were dissolved in 50 ml. of 75% aqueous dimethylsulfoxide. The solution was heated at 60°C for 10 hours. The reaction solution was dried under reduced pressure. 50 ml. of water and 50 ml. of ethyl acetate were added to the dried residue and the mixture was agitated. The aqueous layer was further washed with 50 ml. each portion of ethyl acetate for three times. The aqueous layer was adjusted to pH 2.0 by addition of 0.5N hydrochloric acid. 50 ml. of ethyl acetate was further added to the aqueous layer and the mixture was shaken. The ethyl acetate layer was, after washing with water, neutralized to pH 6.5 by addition of 0.5N sodium hydrogen carbonate, while the aqueous layer was freeze-dried to obtain 3.5 g. of light yellow powders.

1 g. of the thus obtained sodium 7-[(isobornyloxycarbonyl)amino]-3-(2-oxo-5-methylpyrimidin-4-ylthio)-methylceph-3-em-4-carboxylate was dissolved in 20 ml. of water. The solution was adjusted to pH 2.0 by addition of 0.1N hydrochloric acid under cooling on ice. The mixture was shaken with 30 ml. of ethyl acetate for three times. The ethyl acetate layer were, after washing with water, dried under reduced pressure. The residue was dissolved in 10 ml. of trifluoroacetic acid. The solution, after addition of 0.5 ml. of anisole, was stirred at room temperature for one hour. The reaction solution was dried under reduced pressure. 50 ml. of ethyl ether was added to the residue and the mixture was stirred thoroughly. 0.73 g. of white powders were obtained.

m.p.: 105°–110°C (decomp.)
IR absorption spectrum (KBr)
1,780 cm$^{-1}$ (β-lactam), 1,730 cm$^{-1}$ (—CONH—, —COOH), 1,610 cm$^{-1}$, 1,670 cm$^{-1}$ (—CONH—)
Elementary analysis:
Calculated for $C_{13}H_{14}N_4S_2O_4 \cdot CF_3COOH$:
C, 39.65; H, 3.52; N, 12.33, S, 14.10
Found:
C, 40.84; H, 3.93; N, 12.14; S, 14.12

What we claim is:
1. A compound of the formula

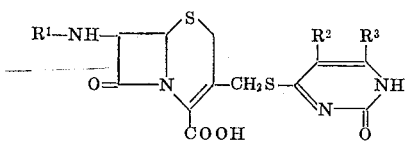

wherein $R^1$ is an acyl group of the formula,

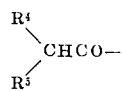

wherein $R^4$ is phenyl, phenoxy, cyclohexenyl, thienyl, phenylthio, 3-amino-3-carboxypropyl, cyano, tetrazolyl, or cyclohexyl group; and $R^5$ is hydrogen, amino, carboxyl, sulfo, carbamoyl, halogen or hydroxy group, $R^2$ and $R^3$ represent hydrogen, a alkyl group having one to four carbon atoms, carboxylic group, amino group, dimethylamino group, or hydroxymethyl group, respectively, or $R^2$ and $R^3$ may be bonded to form —NH—CH=N— group or a salt thereof.

2. A compound according to claim 1, wherein $R^1$ is 2-thienylacetyl group.

3. A compound according to claim 1, wherein $R^1$ is phenylacetyl group.

4. A compound according to claim 1, wherein $R^1$ is phenylthioacetyl group.

5. A compound according to claim 1, wherein both $R^2$ and $R^3$ are hydrogen atoms.

6. A compound according to claim 1, wherein one of $R^2$ and $R^3$ is methyl group and the other is hydrogen atom.

7. A compound claimed in claim 1, namely 7-(2-thienylacetamido)-3-(2-oxopyrimidin-4-ylthio)-methylceph-3-em-4-carboxylic acid.

8. A compound claimed in claim 1, namely 7-(phenylacetamido)-3-(2-oxopyrimidin-4-ylthio)-methylceph-3-em-4-carboxylic acid.

9. A compound claimed in claim 1, namely 7-(phenoxyacetamido)-3-(2-oxopyrimidin-4-ylthio)-methylceph-3-em-4-carboxylic acid.

10. A compound claimed in claim 1, namely 7-(2-thienylacetamido)-3-(2-oxo-6-methylpyrimidin-4-ylthio)-methylceph-3-em-4-carboxylic acid.

11. A compound according to claim 1, namely 7-(α-carboxyphenylacetamido)-3-(2-oxo-5-methylpyrimidin-4-ylthio-methylceph-3-em-4-carboxylic acid.

12. A compound according to claim 1, wherein $R^4$ is phenyl or thienyl.

13. A compound according to claim 12, wherein $R^4$ is phenyl.

14. A compound according to claim 1, wherein $R^5$ is amino, carboxyl or sulfo.

15. A compound according to claim 14, wherein $R^5$ is carboxyl.

16. A compound according to claim 1, wherein $R^2$ is methyl.

17. A compound according to claim 1, wherein $R^3$ is hydrogen.

18. A compound according to claim 1, wherein said compound is an acid or a salt of sodium, potassium, magnesium, calcium, aluminum or triethylamine.

19. A compound according to claim 1, wherein $R^4$ is selected from the group consisting of phenyl, phenoxy, thienyl and phenylthio and further wherein $R^5$ is hydrogen.

20. A compound according to claim 19, wherein $R^4$ is phenyl.

21. A compound according to claim 19, wherein $R^4$ is phenoxy.

22. A compound according to claim 19, wherein $R^4$ is thienyl.

23. A compound according to claim 19, wherein $R^4$ is phenylthio.

24. A compound according to claim 19, wherein both $R^2$ and $R^3$ are hydrogen atoms.

25. A compound according to claim 19, wherein one of $R^2$ and $R^3$ is a methyl group and the other is a hydrogen atom.

26. A compound according to claim 19, wherein $R^2$ is methyl.

27. A compound according to claim 19, wherein $R^3$ is hydrogen.

28. A compound according to claim 19, wherein said compound is an acid or a salt of sodium, potassium, magnesium, calcium, aluminum or triethyl amine.

29. A compound according to claim 19, namely disodium 7-(α-carboxyphenylacetamido)-3-(2-oxo-5-methylpyrimidin-4-ylthio)-methylceph-3-em-4-carboxylate.

30. A compound according to claim 19, namely 7-(2-thienylacetamido)-3-(2-oxo-5-methyl-pyrimidin-4-ylthio)-methylceph-3-em-4-carboxylic acid.

* * * * *